United States Patent Office 3,732,258
Patented May 8, 1973

3,732,258
LINEAR COPOLYMERS OF VINYLCYCLOHEXENE DIEPOXIDE AND 1,2 ALKYLENE OXIDES BY CATALYSIS WITH A TERTIARY-AMINE WATER SYSTEM
Gary L. Statton, Wallingford, Pa., assignor to Atlantic Richfield Company, Philadelphia, Pa.
No Drawing. Filed Dec. 10, 1970, Ser. No. 97,045
Int. Cl. C08g 23/14
U.S. Cl. 260—348 C
12 Claims

ABSTRACT OF THE DISCLOSURE

Liquid linear soluble copolymers of vinylcyclohexene diepoxide and 1,2-monoepoxides can be produced in good yield using a catalyst system comprising a tertiary amine and an active hydrogen-containing compound.

BACKGROUND OF THE INVENTION

Copolymers of diepoxides and monoepoxides have been recognized as having improved properties such as flexibility and stability when used in adhesive, coating, and laminating and casting compositions. Morehouse et al. 2,555,500, teaches the production of such polymers using catalytic amounts of boron trifluoride and butanol. A limitation of this process is that the monoepoxide used has to be free of active hydrogen-containing groups.

Bailey, 3,297,783, teaches that metal salts and complexes of such metal salts can be used as a catalyst in the polymerization of vinylcyclohexene with 1,2 alkylene oxides. This particular catalyst system produces solid copolymers which may be advantageous or disadvantageous depending upon the planned further use of the product. Bailey goes on to produce vinyl resins with his product and as pointed out in Examples 23 through 33, therein it is necessary to operate at high temperatures and/or use solvents in order to put the polymer back into a liquid state. A limitation of this process is that the monoepoxide used has to be a 1,2 alkylene oxide free of ethylenic or acetylenic unsaturation.

Accordingly, it is an object of this invention to produce stable liquid copolymers of vinylcyclohexene and 1,2-monoepoxides. It is a further object to produce such copolymers in good yield. A still further object is to develop a catalyst system for producing copolymers of vinylcyclohexene diepoxides and 1,2-monoepoxides that remain in the liquid state for ease of use in coating operations prior to final cure. Another object is to develop a catalyst system for this process which can be used on 1,2-monoepoxides having active hydrogen-containing groups. These and other objects will readily become apparent to those skilled in the art in the light of the teaching herein set forth.

It is known that the two epoxy groups found in the vinylcyclohexene diepoxide monomer have different levels of reactivity and I have found that using a catalyst system comprising a tertiary amine and an active hydrogen-containing compound, I can cause the vinylcyclohexene diepoxide to polymerize through the alkylene epoxide group while the cycloaliphatic epoxide remains essentially unaffected.

Suitable tertiary amines are used in a catalytic amount sufficient to initiate polymerization. This is generally in the amount of 0.1 percent to 25 percent based on the weight of the epoxide monomers and more preferably 1 to 5 percent based on the weight of the epoxide monomers. Suitable tertiary amines include the aliphatic amines such as triethylamine, trimethylamine, dimethyl-N-propylamine and the like, aliphatic aryl amines such as benzyldimethylamine and N,N-dimethyl analine and tertiary aliphatic diamines such as triethylenediamine and N,N-tetramethylethylenediamine.

The active hydrogen-containing compound can consist of water, hydrogen sulfide, alcohols, polyols, carboxylic acids or mercaptans and is used in amounts of 0.01 to 10.0 percent by weight based on the weight of epoxides. Preferably, the active hydrogen compound is present in amount of 0.05 to 5.0 percent by weight of the epoxides.

Suitable alcohols consist of aliphatic or cycloaliphatic alcohols having up to about 12 carbon atoms, such as methyl alcohols, isopropyl alcohols, n-octyl alcohol, dodecyl alcohol, cyclohexanol, cyclobutanol, etc. Likewise, the mercaptans suitable for use in the invention include those having up to about 12 carbon atoms, including methyl mercaptan, isopropylmercaptan and decyl mercaptan.

Polyols can include those having a molecular weight up to 3,000, including ethylene glycol, glycerol, propylene glycol and the polyoxypropylene diols and triols. Suitable carboxylic acids include formic acid, acetic acid, butyric acid, succinic acid, benzoic acid and the like.

Generally, the polymerization can be conducted over a wide range of temperatures from about 0° C. to about 250° C. A particularly preferred range is from about 10° C. to 120° C. The polymerization can be conducted under atmospheric, subatmospheric or superatmospheric pressures.

In addition, organic solvents including aromatics such as benzene and toluene, ketones such as acetone and methyl ethyl ketone, cyclohexanone and tetrahydrofuran can be used in the polymerization although the latter tends to result in polymers having lower epoxide functionality.

Using the catalyst system discussed above, one can obtain a polymer having repeating units as represented by the following formula:

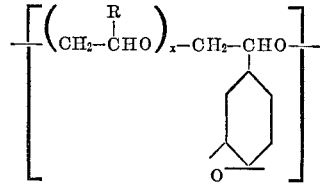

The value of X will depend on the initial ratio of the monoepoxide to diepoxide as well as reaction conditions, and can be varied over a wide range. X, therefore, can vary between 0.01 and 100 giving rise to polymers having varied physical characteristics. R can be hydrogen or a hydrocarbon radical having 1 to 5 carbon atoms including saturated and unsaturated, aliphatic, cycloaliphatic aromatic and heterocyclic groups or an ether radical having up to 15 carbon atoms. It can be substituted with halogen atoms, hydroxyl groups, mercapto groups and the like.

Preferred 1,2-monoepoxides for the copolymerization with vinylcyclohexene diepoxide include ethylene oxide, propylene oxide, styrene oxide, butene-1 oxide, pentene-1-oxide, isobutylene oxide, butadiene monoepoxide, dodecene oxide, epifluorohydrin, glycidol and epoxide ethers such as methyl glycidyl ether, cyclopentyl glycidyl ether, allyl glycidyl ether, phenyl glycidyl ether.

The linear soluble polymers of this invention when cured are suitable for preparing protective coatings, binders for laminates, adhesives and molding compounds. Lewis acids or bases, particularly organic anhydrides, organic and inorganic acids or organic primary and secondary amines will result in crosslinking through the cycloaliphatic epoxide to provide the cured products.

The following examples further illustrate the present invention and are not intended to limit the scope thereof in any manner.

EXAMPLE 1

Vinylcyclohexene diepoxide in the amount of 7.5 grams, 9.2 grams of propylene oxide, 0.03 gram of water and 0.63 gram of trimethylamine were charged into a nitrogen-purged polymerization bottle. After 24 hrs. at 90° C., analysis indicated 96 percent conversion to copolymer. The mixture was stripped of catalyst and unreacted propylene oxide yielding a viscous liquid having an epoxy equivalent weight of 430 and a number average molecular weight of 881.

EXAMPLE 2

Vinylcyclohexene diepoxide in the amount of 20.0 grams, 8.2 grams of propylene oxide, 0.06 gram of water and 0.63 gram of trimethylamine were charged into a nitrogen-purged polymerization bottle. After 24 hrs. at 90° C., analysis indicated 96 percent conversion to copolymer. The mixture was stripped of catalyst and unreacted propylene oxide yielding a viscous liquid having an epoxy equivalent weight of 346 and a number average molecular weight of 1185.

EXAMPLE 3

Vinylcyclohexene diepoxide in the amount of 3.2 grams, 13.3 grams of propylene oxide, 0.03 gram of water and 0.63 gram of trimethylamine were charged into a nitrogen-purged polymerization tube. After 24 hrs. at 90° C., analysis indicated 86 percent conversion to copolymer. The mixture was stripped of catalyst and unreacted propylene oxide yielding a viscous liquid having an epoxy equivalent weight of 395 and a number average molecular weight of 668.

EXAMPLE 4

Vinylcyclohexene diepoxide in the amount of 15.0 grams, 18.3 grams of propylene oxide, 0.67 gram of water and 1.7 grams of benzyldimethylamine were charged into a nitrogen-purged flask. After 24 hrs. at 90° C., analysis indicated 85 percent conversion to copolymer. After stripping the mixture of unreacted propylene oxide and catalyst, the viscous liquid had an epoxy equivalent weight of 425 and a number average molecular weight of 586.

EXAMPLE 5

Vinylcyclohexene diepoxide in the amount of 20.0 grams, 2.1 grams of propylene oxide, 0.55 gram of trimethylamine and 0.37 gram of n-butanol were charged into an Argon-purged polymerization tube. After 24 hrs. at 90° C., analysis indicated 65% conversion to copolymer. After stripping the mixture of unreacted propylene oxide and catalyst the viscous liquid had an epoxy equivalent weight of 160.

EXAMPLE 6

Vinylcyclohexene diepoxide in the amount of 20.0 grams, 8.4 grams of propylene oxide, 1.08 grams of triethylenediamine (Dabco) and 0.06 gram of water were charged into an Argon-purged polymerization tube. After 8 days at room temperature, analysis indicated 81 percent conversion to copolymer. After stripping the unreacted propylene oxide and catalyst the viscous liquid had an epoxy equivalent weight of 168.

EXAMPLE 7

Vinylcyclohexene diepoxide in the amount of 20.0 grams, 8.4 grams of propylene oxide, 0.71 gram of trimethylamine and 0.72 gram of acetic acid were charged into an Argon-purged polymerization tube. After 8 days at room temperature, analysis indicated 91 percent conversion to copolymer which was a viscous liquid.

EXAMPLE 8

Vinylcyclohexene diepoxide in the amount of 27.4 grams, 10.0 grams dodecene oxide, 1.7 grams of benzyldimethylamine and 0.70 gram of water were charged into an argon-purged bottle, mixed and allowed to set at room temperature for 48 hours. The bottle and contents were then warmed to 45° C. for a further 72 hours. Analysis of the reaction mixture indicated 70% conversion to a viscous liquid copolymer.

EXAMPLE 9

Vinylcyclohexene diepoxide in the amount of 20.0 grams, 10.0 grams of glycidal, 1.7 grams of benzyldimethylamine and 0.70 gram of water were charged into an argon-purged bottle, mixed and allowed to set at room temperature. After 24 hours analysis indicated a 64% conversion to a viscous liquid copolymer.

EXAMPLE 10

Vinylcyclohexene diepoxide in the amount of 20.0 grams, 10.0 grams of butadiene monoepoxide, 1.7 grams of benzyldimethylamine, 0.60 gram of water were charged into an argon-purged bottle mixed and allowed to set for 48 hrs. at room temperature. The solution was then warmed to 45° C. for 72 hours. The resulting viscous liquid was stripped under vacuum and analyzed indicating a 71% conversion to copolymer.

I claim:

1. A process comprising the preparation of linear soluble copolymers of vinylcyclohexene diepoxide and 1,2 monoepoxides having 2 to 17 carbon atoms in the presence of a catalyst system consisting essentially of a tertiary amine and an active hydrogen-containing compound selected from the group consisting of aliphatic and cycloaliphatic alcohols having up to 12 carbon atoms, mercaptans having up to 12 carbon atoms, polyols having a molecular weight up to 3,000, water, hydrogen sulfide and carboxylic acids having up to 12 carbon atoms; said amine being present in an amount of 0.1 to 25 percent by weight based on the weight of the epoxide monomers and said active hydrogen-containing compound being present in an amount of 0.01 to 10 percent by weight based on the weight of the epoxide monomers; said polymerization reaction taking place between 0° and 250° C. to yield polymers having repeating units as represented by the formula

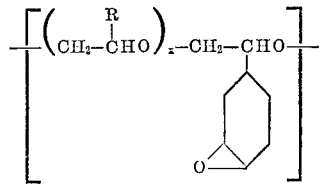

wherein X can vary between 0.01 and 100 and R can be hydrogen, a hydrocarbon radical or an ether radical having 1 to 15 carbon atoms.

2. The process of claim 1 wherein said amine is present in an amount between 1 and 5 percent by weight based on the epoxide monomers.

3. The process of claim 1 where said active hydrogen-containing compound is present in an amount of 0.05 to 5.0 percent by weight of the epoxide monomers.

4. The process of claim 3 wherein the active hydrogen-containing compound is water.

5. The process of claim 1 wherein the polymerization is carried out between 10° and 120° C.

6. The process of claim 1 wherein propylene oxide is polymerized with vinylcyclohexene diepoxide using a catalyst system consisting of trimethylamine and water.

7. In the production of linear, soluble, liquid copolymers of vinylcyclohexene diepoxide and propylene oxide suitable for use in adhesives, coatings, laminating and casting compositions upon curing, the improvement comprising the use of tertiary amines and an active hydrogen-containing compound selected from the group consisting of aliphatic and cycloaliphatic alcohols having up to 12 carbon atoms, mercaptans having up to 12 carbon atoms, polyols having a molecular weight up to 3,000, water, hydrogen sulfide and carboxylic acids having up to 12 carbon atoms as the catalyst system for said polymerization.

8. The process of claim 7 wherein the catalyst system consists essentially of the tertiary amine in an amount of 0.1 to 25 percent by weight based on the weight of the epoxide monomers and the active hydrogen-containing compound in an amount of 0.01 to 10 percent by weight based on the weight of the epoxide monomers.

9. The process of claim 10 wherein the trimethylamine is present in an amount between 1 and 5 percent by weight based on the epoxide monomers and the water is present in an amount of 0.05 to 5.0 percent by weight of the epoxide monomers.

10. The process of claim 8 wherein trimethylamine and water are used as the tertiary amine and active hydrogen containing compound respectively.

11. The process of claim 1 wherein said polyol is selected from the group consisting of ethylene glycol, glycerol, propylene glycol, and polyoxypropylene diols and triols having a molecular weight up to 3,000.

12. The process of claim 7 wherein said polyol is selected from the group consisting of ethylene glycol, glycerol, propylene glycol, and polyoxypropylene diols and triols having a molecular weight up to 3,000.

References Cited
UNITED STATES PATENTS

| | | | |
|---|---|---|---|
| 2,555,500 | 6/1951 | Morehouse et al. | 260—2 EP |
| 3,303,145 | 2/1967 | Carlson | 260—2 A |

WILLIAM H. SHORT, Primary Examiner

T. E. PERTILLA, Assistant Examiner

U.S. Cl. X.R.

260—2 EP, 47 EP, 80 C, 88.3 A